No. 713,803. Patented Nov. 18, 1902.
J. ROTHWEILER.
INSECT TRAP.
(Application filed June 30, 1902.)
(No Model.)
Fig. I.
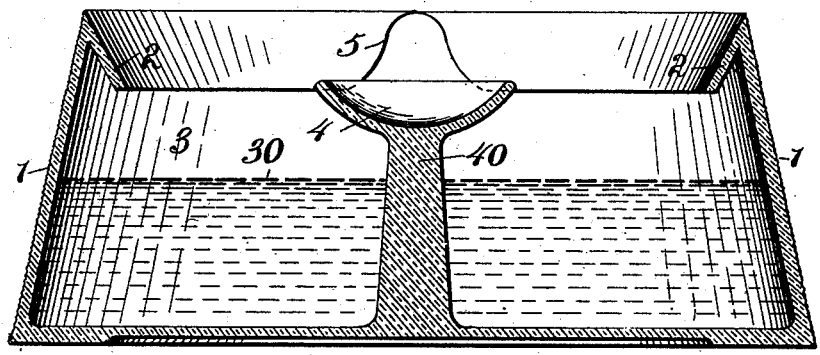
Fig. II.
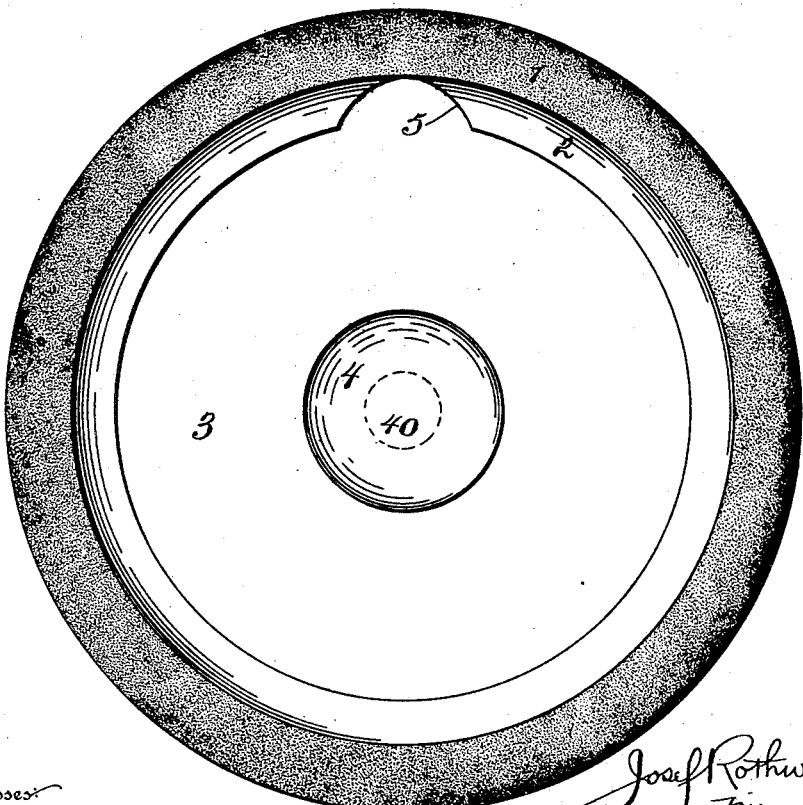
Witnesses:
Geo. E. Frech
J. R. Martin
Inventor.
Josef Rothweiler
by
Collamer & Co.,
Attorneys

UNITED STATES PATENT OFFICE.

JOSEF ROTHWEILER, OF CHICAGO, ILLINOIS.

INSECT-TRAP.

SPECIFICATION forming part of Letters Patent No. 713,803, dated November 18, 1902.

Application filed June 30, 1902. Serial No. 113,814. (No model.)

*To all whom it may concern:*

Be it known that I, JOSEF ROTHWEILER, a citizen of the United States, and a resident of Chicago, Cook county, State of Illinois, have invented certain new and useful Improvements in Insect-Traps; and my preferred manner of carrying out the invention is set forth in the following full, clear, and exact description, terminating with claims particularly specifying the novelty.

This invention relates to traps, and more especially to that class thereof which are adapted and intended to catch insects, such as roaches or others which crawl.

The object of the invention is to improve the construction of devices of this character, to which end it consists in the details hereinafter pointed out.

The invention is more fully described in the following specification, pointed out the claims, and shown in the drawings, wherein—

Figure I is a central longitudinal sectional view of this trap, and Fig. II is a plan view of the same.

Referring to the drawings, the numeral 3 designates the body intended to be about half filled with water to the water-line 30. This body is of clay or similar material, glazed on its interior and rough on its exterior, as at 1. It has a flat bottom and slightly conical side walls, and by reason of its rough exterior the insects can crawl upward over the same. In shape this body is circular, as seen in Fig. II, and at the top of its side wall is a downwardly-projecting flange 2, which is glazed or smooth on its upper surface, whereby when the insects have crawled up the exterior 1 and over onto the flange 2 they slip down the latter into the water and are trapped.

The numeral 40 designates a pillar or post preferably molded integral with the bottom and rising therefrom at the center thereof, and at the top of this post is formed a cup 4, in which food is placed, so as to constitute the bait to attract the insects. The periphery of this food-cup is sufficiently remote from the upper edge of the top to prevent the insects from doing more than reach toward it, and this prevents consumption of bait.

The water is poured into the device in a manner which will be clear, and it is poured out of it through a notch 5, formed at one point in the flange 2 for this purpose. If it were not for this notch, the water would be trapped in the interior and could not all be poured out.

As before stated, the device is preferably molded from clay or pottery of suitable thickness and preferable dimension, the important features being that it shall be rough on the exterior of the body and smooth on the interior of the flange, and also that there shall be a notch in the latter to permit the pouring out of the water.

What is claimed as new is—

1. An insect-trap consisting of a cup-shaped receptacle having conical side walls which are rough on their exterior, and an inwardly-projecting flange at the upper end of said walls and smooth on its interior; combined with a centrally-disposed bait-receptacle, and a notch in said flange at one side, for the purpose set forth.

2. An insect-trap consisting of a circular cup-shaped receptacle having conical side walls, and an inwardly-projecting flange at the upper end of said walls the flange having a notch at one side; combined with a pillar rising from the base of said receptacle and having a cup at its upper end for bait, the walls of the cup being farther removed from the innermost edge of the flange than the distance which the ordinary insect can reach, as and for the purpose set forth.

In testimony whereof I have hereunto subscribed my signature this the 23d day of June, A. D. 1902.

JOSEF ROTHWEILER.

Witnesses:
F. A. SMEJEA,
A. KAISER.